Dec. 10, 1963     L. B. JOHNSTON     3,113,788
CUSHIONING STRUCTURE OF FIBROUS GLASS
Filed Dec. 31, 1956     4 Sheets—Sheet 1
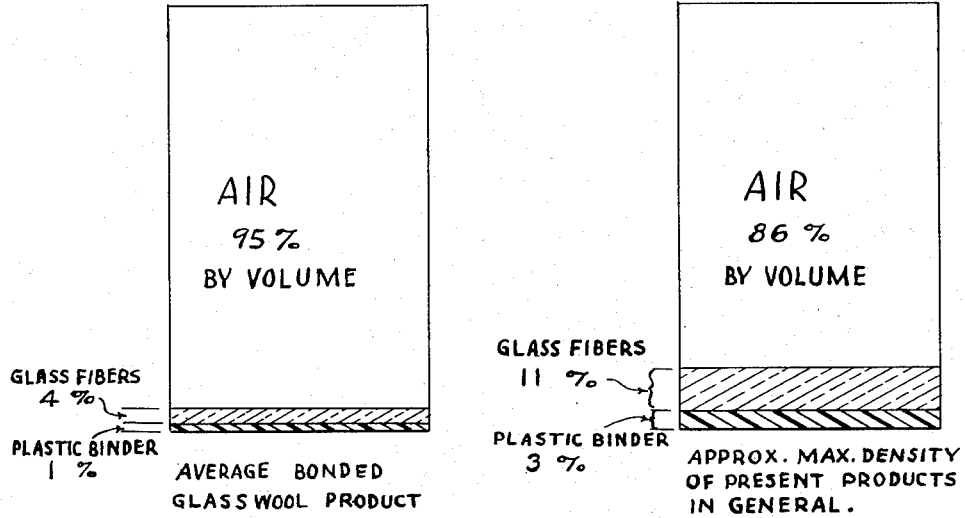
FIG-1-     FIG-2-
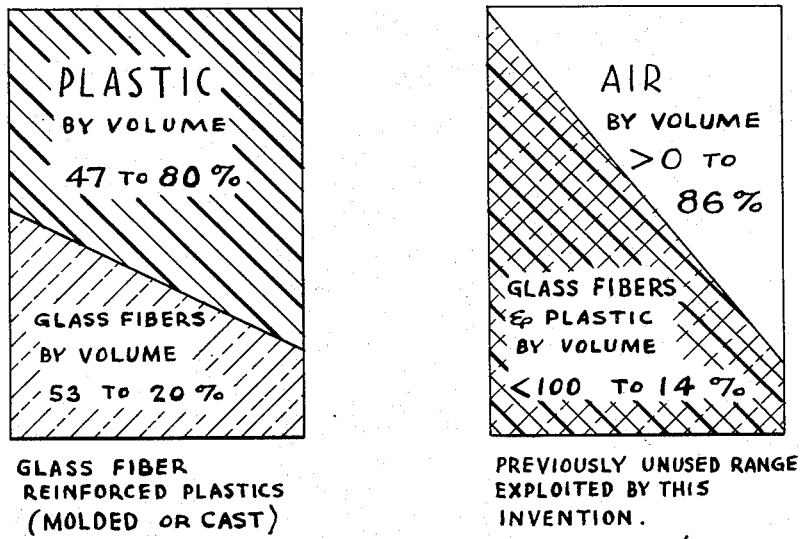
FIG-3-     FIG-4-
INVENTOR:
LOWELL B. JOHNSTON.
BY
ATTORNEYS.

Dec. 10, 1963 L. B. JOHNSTON 3,113,788
CUSHIONING STRUCTURE OF FIBROUS GLASS
Filed Dec. 31, 1956 4 Sheets-Sheet 2
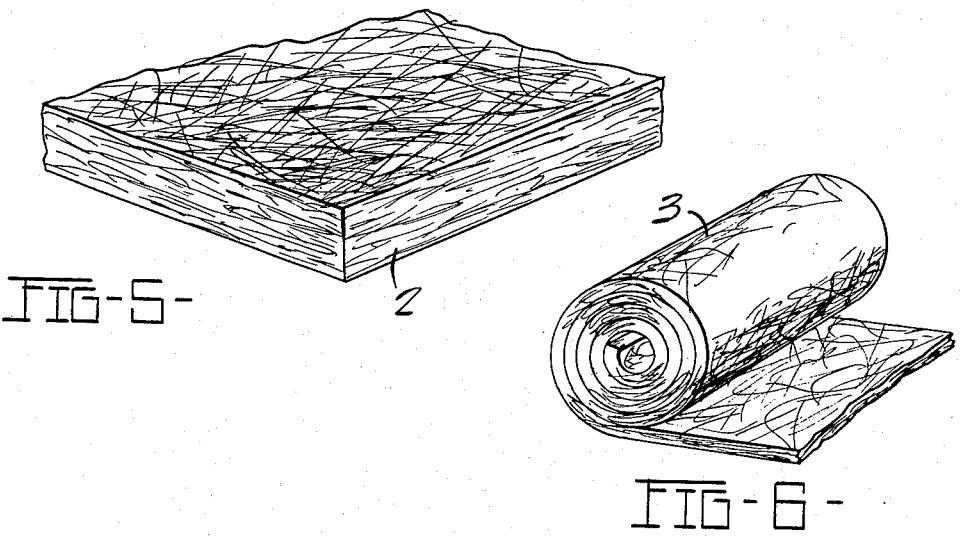
INVENTOR:
LOWELL B. JOHNSTON.
BY
ATTORNEYS.

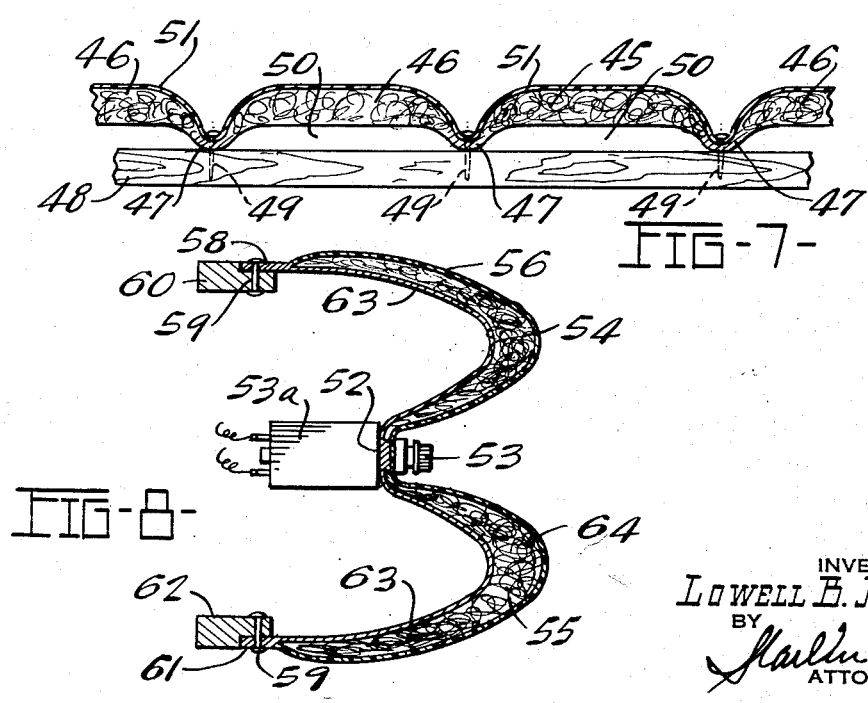

Dec. 10, 1963 L. B. JOHNSTON 3,113,788
CUSHIONING STRUCTURE OF FIBROUS GLASS
Filed Dec. 31, 1956 4 Sheets-Sheet 4
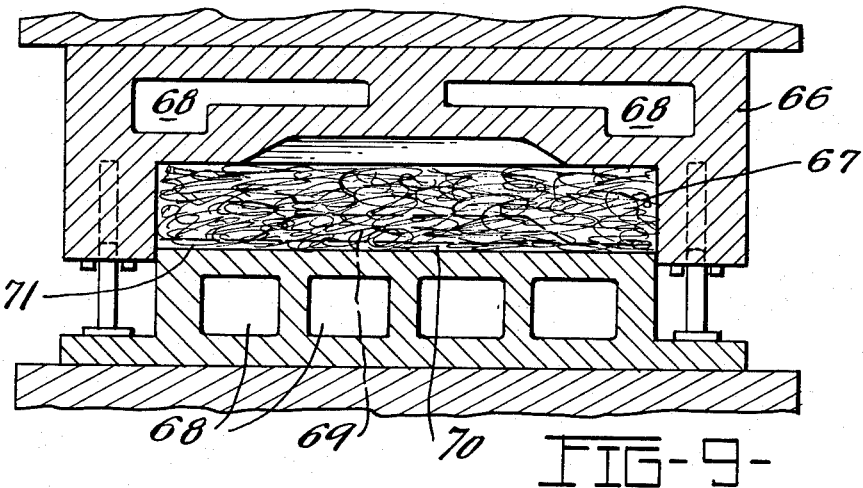
FIG-9-
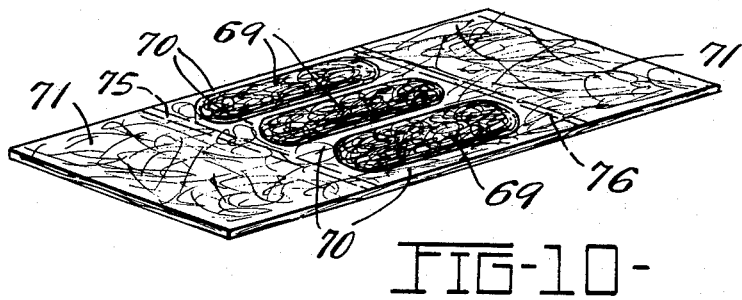
FIG-10-
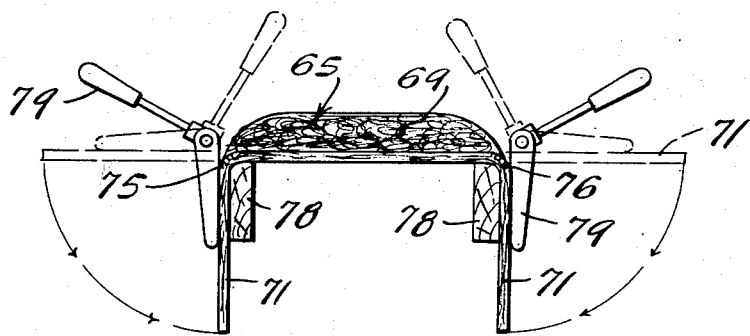
FIG-11-
INVENTOR:
LOWELL B. JOHNSTON.
BY
ATTORNEY

United States Patent Office 3,113,788
Patented Dec. 10, 1963

3,113,788
CUSHIONING STRUCTURE OF FIBROUS GLASS
Lowell B. Johnston, Newark, Ohio, assignor to Owens-Corning Fiberglas Corporation, a corporation of Delaware
Filed Dec. 31, 1956, Ser. No. 631,830
3 Claims. (Cl. 280—150)

This invention relates primarily to articles composed of fibrous glass and a plastic. More specifically the invention relates to such articles and methods in which the articles involved are composed of an integrated combination of two distinct fibrous glass and plastic structures in both of which fibrous glass provides dominant characteristics. The invention further relates to a unique air permeated, plastic bonded, fibrous glass structure of stress resisting capacity.

Broadly considered, fibrous glass has been utilized in two major fields—as plastic bonded, pervious masses and as combined with plastic in closely compacted bodies. In both, advantage is taken of its attenuated form, while its chemical inertness is mainly of value in the first field and its high strength is of special significance in the second.

The original and probably the present principal use for fibrous glass is in comparatively loosely packed masses in which the fibers are closely associated in the manner of the cellulose fibers in cotton batting. A binding agent is ordinarily employed to aid in the coherence of the mass. The highest utility of this form, generally referred to as glass wool, has been in the absorption and resistance to movement of sound, heat and corporeal substances.

In this kind of fibrous glass product at least ninety-five percent of the mass usually consists of air space and the balance comprises glass fibers and the binder. The plastic binding material rarely exceeds twenty percent by weight of the two combined materials. This is approximately thirty-three percent by volume due to the wide difference in specific gravities of the two substances. The latter figure relates to the comparative volumes of the glass fibers and the plastic binder and does not take into consideration the air content of the mass. The bonded fiber glass mass has a density of approximately seven pounds per cubic foot, derived from the weight of the glass fibers and plastic, when the proportion of air is ninety-five percent.

It is believed that, in general, products of bonded glass wool so far commercialized have not had a density greater than approximately twenty pounds per cubic foot, with air space accounting for about eight-six percent of the total volume.

The second field in which fibrous glass has been most successfully exploited relates to generally rigid, solid bodies of glass fiber reinforced plastics. Here the strength of the fibrous glass has been the characteristic of the greatest value, as it is the factor that enables these products to bear tremendous loads. The plastic component provides shape and appearance and the dielectric property of the plastic is also of importance when such solid combinations of glass fibers and plastics are applied to electrical apparatus.

The proportion of glass fibers in reinforced plastics depends upon the strength desired in the particular product, but usually lies in the range of twenty to fifty percent, by volume. It is present in the highest degree in comparatively thin electrical insulating coverings composed of fibrous glass fabrics impregnated with plastic.

In fibrous glass reinforced plastic objects there is practically no incorporation of air in contrast to the minimum of eighty-six percent in commercial bodies of bonded glass wool; and the density of reinforced plastic ordinarily ranges between one hundred, and one hundred and ten pounds per cubic foot compared to the maximum of twenty pounds for products of bonded glass wool. While composed of the same two basic materials there is this great differentiation in their densities and the properties derived therefrom.

Research people devoting their talents to the development of uses and products of glass fibers are highly respected for their advanced thinking and their disregard for traditional practices in venturing into new fields; surprisingly enough, they have so far overlooked the possibilities of entering or bridging the wide zone between these two types of glass fiber and plastic products. This broad, unexplored zone may be defined as including all air permeated, plastic bonded fibrous glass masses of densities anywhere between twenty and ninety pounds per cubic foot with an air content ranging up to eighty-six percent.

Applicant is, accordingly, deserving of very special recognition for apparently first crossing this sacrosanct barrier and discovering the impressive usefulness of the air permeated, bonded fibrous glass masses in the broad range so long ignored, and the remarkable utility of articles for the first time uniting the physical characteristics and attributes of the two previously diverse product categories.

The principal object of this invention is accordingly to provide fibrous glass and plastic articles of the described dual nature and methods of producing such articles.

More specifically, it is the object of the invention to provide panels of impact or weight receiving cushions of glass fiber with integral supporting ribs, frames, or legs.

The purposes of this invention are attained in a preferred manner by high densification by compression of selected sections only of masses of glass fibers containing a plastic bonding agent, and curing the bonding agent while the portions of the mass are held in such densified condition.

Additional methods of securing the objects of the invention, as well as other advantages and benefits thereof, may be better understood from the following description and by referring to the drawings, in which:

FIGURE 1 is a bar chart with segments indicating the percentage of volume of an average commercial mass of bonded glass wool occupied by the three constituents—air, glass and plastic binder;

FIGURE 2 is a similar chart showing the relative content by volume of the same elements in generally utilized commercial glass wool of the greatest density;

FIGURE 3 is a chart relating to the proportions of the plastic and glass fibers in reinforced plastic bodies;

FIGURE 4 is a like chart indicating the combinations of air, plastic, and fibrous glass, which have not previously been utilized;

FIGURE 5 is a perspective view of a broken section of a batt of glass fibers as cut in rectangular block form from the continuous pack or web carried by a conveyor from the glass wool forming station;

FIGURE 6 is a perspective view of a rolled blanket of glass wool;

FIGURE 7 is a broken section of an article having densified strip portions depending below intervening upwardly bowed cushion areas;

FIGURE 8 is a sectional view of a crash pad having impact receiving portions and densified supporting sections;

FIGURE 9 is a vertical section of a mold designed for forming a cushioned stool blank;

FIGURE 10 is a perspective view of the product of the mold of FIGURE 9; and

FIGURE 11 shows an elevation of the cushioned stool shaped from the blank of FIGURE 10.

The glass fibers involved in the products and methods of this invention are more commonly of a diameter between fifteen and twenty hundred-thousandths of an inch but may have diameters in the range between three and one hundred hundred-thousandths. Such fine fibers are produced by well established, very concise, ingenious processes utilizing high pressure steam jets or high velocity, superheated gases to attenuate streams of molten glass. As these fibers, in various lengths, but seldom surpassing several inches, drop away from the forming station they are coated with a binding material discharged from adjacently positioned spray devices.

The fibers fall upon a conveyor and accumulate thereon to a depth usually in the range of two to eight inches, according to the thickness desired, and as controlled by the speed of the conveyor and the production rate of the fibers. The continuous blanket or pack of glass fibers travels with the conveyor and ordinarily passes through a baking oven for setting of the binding agent, which preferably is a phenol-formaldehyde resin. However, for purposes of this invention the binder is not set or cured at this stage.

Depending upon the ultimate use for which it is intended the packed web of glass fibers is cut at the discharge end of the conveyor into block sections 2, such as illustrated in FIGURE 5, or divided into broad strips 3 and rolled as depicted in FIGURE 6.

Either the block or rolled glass wool stock is adaptable to this invention, although the former would be more suitable where it could be cut to size or where it would have a thickness not feasible for rolled batting stock.

In FIGURE 7 is shown, in cross section, a portion of a panel 45 designed for impact or weight cushioning and formed under compression molding according to this invention. Its undulating shape includes upwardly bowed areas 46, separated by parallel strips 47 of densified supporting character. The raised cushioned portions 46 may have a density around eighteen pounds per cubic foot, with the supporting strips of a sturdy densification, in the neighborhood of sixty pounds.

The design permits mounting of such a panel on a foundation frame 48 with nails 49, staples, etc. projected through the strip areas, leaving the bowed cushioning portions 46 free of contact with any backing. Accordingly, under impact, the arched, cushioning bonded glass fiber sections may not only yield through internal compression but may also disperse the impacting stress through partial bodily movement into the underlying air space 50. Following conventional practice this cushioning panel may be covered with a vinyl coating 51 to improve its appearance and guard against disturbance of its bonded fiber surface.

A cushioning structure, designed specifically for a crash pad to protect passengers from injurious projection against the instrument panel and cowl of an automobile body, is depicted, in section, in FIGURE 8. This has a stiffened center strip 52 to serve not only as a horizontal supporting element for the pad but as an instrument panel, being ported for communication between knobs, gauges and like parts as indicated at 53 on the front of the panel and electrical apparatus 53a on the back.

Above and below the heavily densified strip 52 are arched formations 54 and 55 facing rearwardly toward the seated passengers. These have a resilient, compressible density of approximately twenty pounds, but may have less than that, should a lower degree of resistance be desired. The upper arched formation 54 has a forwardly extending cowl portion 56 having a condensed forward lip 58 for attachment by rivets 59 or other fastening means to a suporting rail 60. Likewise, the lower arched formation 55 has a stiffened lip 61 for connecting to a supporting element 62.

Because of the shape of this crash pad it is difficut to compress the lip portions 58 and 61 in the molding operation to the desired compacted form and it is therefore preferred to place heavily resin-impregnated strips in the mold at these locations. These become integrated portions of the crash pad upon curing of the resin and have a density of approximately seventy pounds, similar to that of center strip 52.

To provide the cushioning arched sections 54 and 55 with an increased shape recovery property as well as a better flexure under impact, a fairly thick, resin impregnated glass fabric 63 is cemented to the back of the sections, either in the molding process, or by a subsequent operation. The loaded fabric backing, in strength approaching a glass fiber reinforced plastic membrane while actually having an air content of thirty percent, acts in conjunction with the cushioning glass wool mass as a leaf spring reacting laterally as well as in line with the impacting force.

This crash pad not only serves most efficiently in its cushioning function through the distribution of the stress it provides, but has other notable features. In the first place the passengers are protected against forcible contact with the control and registering instruments due to the recessed location of the instrument panel, which the shape of the crash pad provides. Of further importance is the self supporting nature of the crash pad which permits it to be mounted on spaced frame elements 60 and 62 and thus eliminates the need of the usual, expensive stamped metal cowling. In order to have the pad present a smooth, decorative appearance it would be covered with a flexible film such as provided by a conventional vinyl coating 64.

In connection with the bonded glass articles so far described in explaining how this invention may be practiced, a phenol-formaldehyde thermosetting plastic resin would function very satisfactorily as a binding agent. It is a standard glass fiber binding material and its qualities and manner of use are well understood. However, once cured, it takes a permanent set and an object in which it is incorporated cannot readily be reshaped. For this reason there may be occasions when the employment of a thermoplastic binding material would be more advantageous in executing this invention.

An article and method of fabrication for which a thermoplastic resin would be suitable are presented in FIGURES 9, 10 and 11. A polystyrene plastic would presently be recommended for the purpose because of its very good, general characteristics, and since its behavior in association with glass fibers is comparatively well understood. It may be sprayed as a water emulsion upon the glass fibers as they fall from their forming station.

The article taken for illustration is a cushioned stool 65 having panelled leg members 71. Since the densification and strength of the closely packed glass fibers require substantial compression in the preferred manner of practicing this invention, a simpler mold may be utilized if the compression forces may be applied in one direction only against stock lying generally in a single plane. This would not be adaptable to producing an article having portions extending in various planes at extreme angles to each other. However, the benefits of a simple mold are available for producing objects with angled members with the use of a thermoplastic resin whereby the final shape may be obtained by reheating and further forming the densified product of the molding operation.

As shown in FIGURE 9, the mold 66 is designed to receive a rectangular blank of glass wool 67 impregnated, for example, with twenty-five percent by weight, of a polystyrene resin. The batt 67, comprising the blank, is eight inches thick and has a density of four pounds per cubic foot. Before it may be formed in the mold, the glass fiber batt must be raised to a temperature causing the polystyrene to reach a state of plasticity. This may be done through preheating or by passing steam through cored passages 68 in the mold.

With the polystyrene in its proper fluid condition the mold is closed upon the rectangular glass fiber blank 67.

The mold is designed to compress the portions intended for cushion areas 69 to a thickness of two inches and a density of sixteen pounds per cubic foot; and to condense the narrow sections 70 along the sides of the cushion portions and the ends 71, ultimately serving as vertical supporting panels, to a thickness of one-half inch and a density of sixty-four pounds. The mold is then cooled to solidify the plastic, preparatory to opening of the mold and removal of the formed blank.

A plan view of the semi-formed stool is depicted in FIGURE 10. The solidified rudimentary leg areas 71 are coplanar with the supporting grid framing 70 which surrounds the cushioning masses 69.

By reheating linear areas indicated at 75 and 76 the polystyrene is softened and the legs may be turned downward over stationary dies 78 into their functioning vertical position through bending tools 79, as portrayed in FIGURE 11.

Reference herein has been restricted to phenol-formaldehyde and polystyrene plastics as they are considered best known, as representative of thermosetting and thermoplastic resins, by technicians in the fibrous glass industry. Other plastic resins are quite adaptable to this invention and may have advantages under certain conditions. For instance, the thermosetting epoxy resins would be superior to phenol-formaldehyde under curing of heavy sections as they do not release gases and extraneous matter. Other examples could involve the better electrical properties of polyesters, and melamines. Therefore it is not desired to limit the scope of this invention to any particular plastic component.

While the disclosure has presented articles with various shapes of densified strengthened sections such as frames, grids, single and multiple strips, there are many alternate forms which would lend themselves to the practice of this invention and would come within its scope.

Likewise certain specific densities have been cited in describing the embodiments disclosed herein. It should be realized that the densities involved are somewhat relative in that a fluffy stock of bonded glass fibers may be held for light duty by a strengthened section of quite low density, while an article for impact cushioning would require an integrated supporting section of considerable densification and sturdiness.

The cushioning panel depicted in FIGURE 7, in addition to its adaptation of the more basic principles of this invention, has a design arrangement peculiarly suitable to its cushioning function. The closely positioned supporting strips not only provide a sturdy base for the panel but also act to keep in place the bonded glass wool in the cushioning areas, which may be of a somewhat fluffy nature. By projecting below the cushioned pads the strips also create an air space below the pads into which they may partially move under stress.

The crash pad of FIGURE 8 represents an adaptation of the invention to a product meeting rather severe requirements. It must be a particular shape to serve as the dashboard and cowling but also must be properly positioned to intercept forwardly thrown passengers. At the same time it provides a protected recess for the control instruments. Its novel features include its mounting lips with an extra load of bonding plastic; the flexible, densified backing membranes; the lateral diversion of impact shock derived from the extreme bowed configuration of the cushioning pads; and the special utility of its design in replacing the standard cowling and dashboard.

The broad inventive themes are carried into the stool presented in FIGURE 11. It is generally similar, in having portions of contrasting densities, to preceding articles with the substitution of a thermoplastic resin for the more standard phenol-formaldehyde.

As may be concluded from the preceding, applicant has accomplished the objects of his invention through the creation of new structures of air permeated, plastic bonded glass fibers; and providing articles of plastic and fibrous glass of multiple densities and function.

I claim:

1. A crash pad for mounting within an automobile composed of a continuous mass of bonded fibrous glass and having resilient, relatively thick, impact receiving areas of low density, and sturdy, relatively much thinner, highly densified portions by which the crash pad is supported, one of said densified portions being recessed between impact receiving areas and having sufficient area and strength for serving as an instrument panel, said recessed densified portion having openings for instrument gauges and control devices.

2. A cushioning panel composed of a combination of fibrous glass and a cured plastic resin having a plurality of separate sections, generally disposed in a common plane, of resilient, compressible, low density masses of fibrous glass bonded by the plastic resin and adapted for cushioning purposes, and a comparatively rigid, relatively much thinner, high density portion of fibrous glass bonded by the plastic resin, said portion being intimately integrated with said sections and planarly extending between and around said sections.

3. A cushioning panel, according to claim 2, in which the sections are bowed outwardly on one side of the panel and the high density portion lies outwardly beyond the sections on the other side of the panel, whereby with the panel supported upon the high density portion space is provided behind the sections into which they may move when in cushioning service.

References Cited in the file of this patent

UNITED STATES PATENTS

| | | |
|---|---|---|
| 2,117,371 | Slayter | May 17, 1938 |
| 2,305,516 | Coss et al. | Dec. 15, 1942 |
| 2,349,909 | Meharg | May 30, 1944 |
| 2,357,042 | Coss et al. | Aug. 29, 1944 |
| 2,534,923 | Nagel et al. | Dec. 19, 1950 |
| 2,612,462 | Zettel | Sept. 30, 1952 |
| 2,632,187 | Wooffendale | Mar. 24, 1953 |
| 2,660,736 | Biefeld | Dec. 1, 1953 |
| 2,681,866 | Auchterlonie | June 22, 1954 |
| 2,818,107 | Thaden | Dec. 31, 1957 |
| 2,851,730 | Wilhelmi et al. | Sept. 16, 1958 |
| 2,881,110 | Walker et al. | Apr. 7, 1959 |
| 2,936,826 | Reineman | May 17, 1960 |

OTHER REFERENCES

"New Crash Helmet Offers Greater Protection," Plastics magazine (February 1948), pages 34–38.